United States Patent
Asai (10) Patent No.: US 6,263,059 B1
(45) Date of Patent: Jul. 17, 2001

(54) COMMUNICATION APPARATUS AND STORAGE MEDIUM

(75) Inventor: Norihiko Asai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/204,546

(22) Filed: Dec. 3, 1998

(30) Foreign Application Priority Data

Dec. 4, 1997 (JP) .................................................. 9-333986

(51) Int. Cl.[7] ........................ H04M 11/00; H04M 15/00; H04M 1/56; H04M 1/00; H04M 13/00
(52) U.S. Cl. .................... 379/142; 379/100.15; 379/156; 379/164; 379/183; 379/199; 379/373; 379/375
(58) Field of Search .................................... 379/142, 143, 379/156, 157, 162, 164, 165, 167, 171, 130, 140, 199, 93.01, 93.02, 93.05, 93.09, 93.17, 93.23, 100.06, 100.15, 373, 374, 375, 183

(56) References Cited

U.S. PATENT DOCUMENTS

| | | | |
|---|---|---|---|
| 5,062,133 | * 10/1991 | Melrose | 379/94 |
| 5,187,736 | * 2/1993 | Moriizumi | 379/100 |
| 5,220,599 | * 6/1993 | Sanano et al. | 379/142 |
| 5,343,516 | * 8/1994 | Callele et al. | 379/98 |
| 5,388,150 | * 2/1995 | Schneyer et al. | 379/67.1 |
| 5,517,557 | * 5/1996 | Tanaka | 379/67.1 |
| 5,623,537 | * 4/1997 | Ensor et al. | 379/67.1 |
| 5,768,356 | * 6/1998 | McKendry et al. | 379/201 |
| 5,905,786 | * 5/1999 | Hoope | 379/142 |

FOREIGN PATENT DOCUMENTS 9-266507  10/1997  (JP) ................................ H04M/1/72

* cited by examiner

Primary Examiner—Stella Woo
Assistant Examiner—Binh K. Tieu
(74) Attorney, Agent, or Firm—Oliff & Berridge, PLC (57) ABSTRACT

A communication apparatus is provided for communicating with an external device. The communication apparatus may be a facsimile machine which includes a main phone, and a plurality of secondary handsets capable of communicating with the external device via the main phone. The main phone includes an identification data storage for storing identification data of the external device in a manner such that the identification data is linked to one of the secondary handsets, an identification data detector for detecting the identification data of the external device, an identification data registration checker for determining whether or not the detected identification data is registered in the identification data storage, and a calling sound generation command issuer for causing only one of the secondary handsets to ring when the detected identification data is registered in the identification data storage.

42 Claims, 8 Drawing Sheets

COMMUNICATION APPARATUS AND STORAGE MEDIUM

BACKGROUND OF THE INVENTION

1. Field of the Invention

The present invention relates to a communication apparatus such as a telephone and a facsimile machine, wherein the communication apparatus includes a main phone (provided with a primary handset) and an additional cordless handset (or handsets).

2. Description of the Related Art

Recently, as part of services, telephone exchange stations have been providing telephone subscribers with various kinds of data via telephone networks. An example of such data is "caller ID (caller-identification)." Typically, the caller ID is supplied during silent periods of a calling signal. The contents of the caller ID may be the date and time of a call, the telephone number of a caller, the telephone number of the receiver, the type of the call, the name of the caller, and the conditions of the network systems.

When the caller ID includes information about the telephone number of a caller, the subscriber can enjoy a "number display service" with the use of a specially designed telephone or facsimile machine for that purpose. According to the number display service, the telephone number of a caller will be visually presented on a liquid crystal display of the telephone. Thus, just by looking at the display panel, the receiver (i.e., the user of the receiving telephone) can know who is making a call, even before he or she answers the call.

Consideration is now given to a facsimile machine including a main phone and two additional cordless handsets (a first additional handset and a second additional handset). The main phone is capable of providing number display function, whereas the first and second additional handsets are not. Now, it is supposed that the above facsimile machine is owned by a family consisting of four members (a husband, a wife, a daughter and a son). The main phone may be installed in the living room where every member of the family can use the phone, while the first additional handset may be placed in the daughter's room, and the second additional handset may be placed in the son's room.

Conventionally, in the above circumstances, when someone else dials the telephone number of the family, hoping to talk with a particular one of the family members, not only the main phone but also the first and second additional handsets will be actuated to ring. In such an instance, the wife, who happens to be in the living room, may be the first to answer the call without bothering to check on the displayed telephone number, or it may be the girl who first answered the call through the first additional handset by which the caller's telephone number is not shown.

On the above occasion, however, chances are that it may be the boy (not the wife nor the girl) who is wanted by the caller. If so, whoever first answered the call (the wife or the girl in the above example) needs to transfer the call to the second additional handset belonging to the boy. Unfavorably, such an operation can be troublesome for the wife or the girl. For the boy, who failed to be the first one to answer the call, it may be embarrassing to let other members of the family come to know who has made a call to him.

SUMMARY OF THE INVENTION

It is, therefore, an object of the present invention is to provide a communication apparatus capable of overcoming the problems stated above.

Another object of the present invention is to provide a storage medium incorporated in such a communication apparatus.

According to a first aspect of the present invention, there is provided a communication apparatus for communicating with an external device comprising:

a main unit; and a plurality of secondary units capable of communicating with the external device via the main unit;

wherein the main unit includes:

an identification data storage for storing identification data of the external device in a manner such that the identification data is linked to one of the secondary units;

an identification data detector for detecting the identification data of the external device;

an identification data registration checker for determining whether or not the detected identification data is registered in the identification data storage; and a calling sound generation command issuer for causing only said one of the secondary units to ring when the detected identification data is registered in the identification data storage.

With such an arrangement, when the identification data of the external device is registered in the identification data storage, only one of the secondary units will be caused to ring. Thus, the caller can directly reach a person with whom he or she really wants to talk.

Preferably, the main unit and the plurality of secondary units may be arranged to generate ringing sounds different from one another. In this manner, just by listening to the ringing sound, the users of the communication apparatus can know who the caller is hoping to talk with.

According to a preferred embodiment of the present invention, the main unit comprises an electrically erasable and programmable read only memory serving as the identification data storage. Further, the main unit also comprises a central processing unit serving as the identification data detector, the identification data registration checker and the calling sound generation command issuer.

Preferably, each of the secondary units may be physically separated from the main telephone. For instance, the secondary unit may be a cordless handset. In this arrangement, while talking, the user of the handset can freely move around without being bothered by a cord which otherwise were used for connecting the handset to the main phone.

The identification data detector may be arranged to detect a telephone number of the external device. The telephone number of the caller may be contained in caller identification data transmitted from a telephone exchange station.

In the preferred embodiment, the communication apparatus comprises a facsimile machine.

According to a second aspect of the present invention, there is provided a communication apparatus for communicating with an external device comprising:

a main unit; and at least one secondary unit capable of communicating with the external device via the main unit;

wherein the main unit includes:

an identification data storage for storing identification data of the external device in a manner such that the identification data is linked to either one of the main unit and the secondary unit;

an identification data detector for detecting the identification data of the external device;

an identification data registration checker for determining whether or not the detected identification data is registered in the identification data storage;

an object determiner for determining whether the detected identification data is linked to the main unit or the secondary unit;

a calling sound controller for causing the main unit to ring when the detected identification data is linked to the main unit; and a calling sound generation command issuer for causing only the secondary unit to ring when the detected identification data is linked to the secondary unit.

With such an arrangement, a calling sound will be generated at only a selected unit (i.e., only one of the main unit and the secondary unit). Thus, in this arrangement again, the caller may be able to directly reach a person with whom he or she intends to talk.

Preferably, the main unit and the secondary unit may be arranged to generate ringing sounds different from each other.

In the above apparatus, the main unit may comprise an electrically erasable and programmable read only memory serving as the identification data storage.

Further, the main unit may comprise a central processing unit serving as the identification data detector, the identification data registration checker, the object determiner, the calling sound controller and the calling sound generation command issuer.

According to a third aspect of the present invention, there is provided a communication apparatus for communicating with an external device comprising:

a main unit; and a plurality of secondary units capable of communicating with the external device via the main unit;

wherein the main unit includes:
an identification data detector for detecting identification data of the external device; and
an identification data transmitter for sending the detected identification data of the external device to each of the secondary units; and wherein each of the secondary units includes:
an identification data storage capable of storing the identification data of the external device;
an identification data distinguisher for discerning the identification data transmitted from the identification data transmitter of the main unit;
an identification data registration checker for determining whether or not the discerned identification data is registered in the identification data storage; and
a calling sound controller for causing said each of the secondary units to ring when the discerned identification data is registered in the identification data storage.

In the above apparatus, the main unit may comprise a central processing unit serving as the identification data detector and the identification data transmitter.

Further, each of the secondary units may comprise an electrically erasable and programmable read only memory serving as the identification data storage.

Still further, each of the secondary units may comprise a central processing unit serving as the identification data distinguisher, the identification data registration checker and the calling sound controller.

According to a fourth aspect of the present invention, there is provided a communication apparatus for communicating with an external device comprising:

a main unit; and at least one secondary unit capable of communicating with the external device via the main unit;

wherein the main unit includes:
a primary identification data storage capable of storing identification data of the external device;
an identification data detector for detecting the identification data of the external device;
an identification data transmitter for sending the detected identification data to the secondary unit;
a primary identification data registration checker for determining whether or not the detected identification data is registered in the primary identification data storage; and
a primary calling sound controller for causing the main unit to ring when the detected identification data is registered in the primary identification data storage; and wherein the secondary unit includes:
a secondary identification data storage capable of storing the identification data of the external device;
an identification data distinguisher for discerning the identification data transmitted from the identification data transmitter of the main unit;
a secondary identification data registration checker for determining whether or not the discerned identification data is registered in the secondary identification data storage; and
a secondary calling sound controller for causing the secondary unit to ring when the discerned identification data is registered in the secondary identification data storage.

In the above apparatus, the main unit may comprise an electrically erasable and programmable read only memory serving as the primary identification data storage, the main unit further comprising a central processing unit serving as the identification data detector, the identification data transmitter, the primary identification data registration checker and the primary calling sound controller.

The secondary unit may comprise an electrically erasable and programmable read only memory serving as the secondary identification data storage, the secondary unit further comprising a central processing unit serving as the identification data distinguisher, the secondary identification data registration checker and the secondary calling sound controller.

According to a fifth aspect of the present invention, there is provided a storage medium for storing programs for controlling a main unit of a communication apparatus which is capable of communicating with an external device and provided with an identification data storage for storing identification data of the external device, the communication apparatus including a plurality of secondary units which are physically separated from the main unit, the storage medium comprising:

an identification data detecting program for detecting the identification data of the external device;

an identification data registration checking program for determining whether or not the detected identification data of the external device is registered in the identification data storage in a manner such that the identification data is linked to one of the plurality of secondary units; and a calling sound generation command issuing program for issuing a command to cause only said one of the plurality of secondary units to ring when the detected identification data of the external device is registered in the identification data storage.

According to a sixth aspect of the present invention, there is provided a storage medium for storing programs for controlling a main unit of a communication apparatus which is capable of communicating with an external device and provided with an identification data storage for storing identification data of the external device, the communication apparatus including at least one secondary unit which is physically separated from the main unit, the storage medium comprising:

an identification data detecting program for detecting the identification data of the external device;

an identification data registration checking program for determining whether or not the detected identification data of the external device is registered in the identification data storage in a manner such that the identification data of the external device is linked to one of the main unit and the secondary unit;

an object determining program for determining whether the detected identification data of the external device is linked to the main unit or the secondary unit;

a calling sound controlling program for causing the main unit to ring when the detected identification data of the external device is linked to the main unit; and a calling sound generation command issuing program for issuing a command to cause the secondary unit to ring when the detected identification data of the external device is linked to the secondary unit.

Other features and advantages of the present invention should become clear from the detailed description to be made hereinafter referring to the accompanying drawings.

DETAILED DESCRIPTION OF THE PREFERRED EMBODIMENT

The preferred embodiments of the present invention will be described below with reference to the accompanying drawings.

Figure 1A:
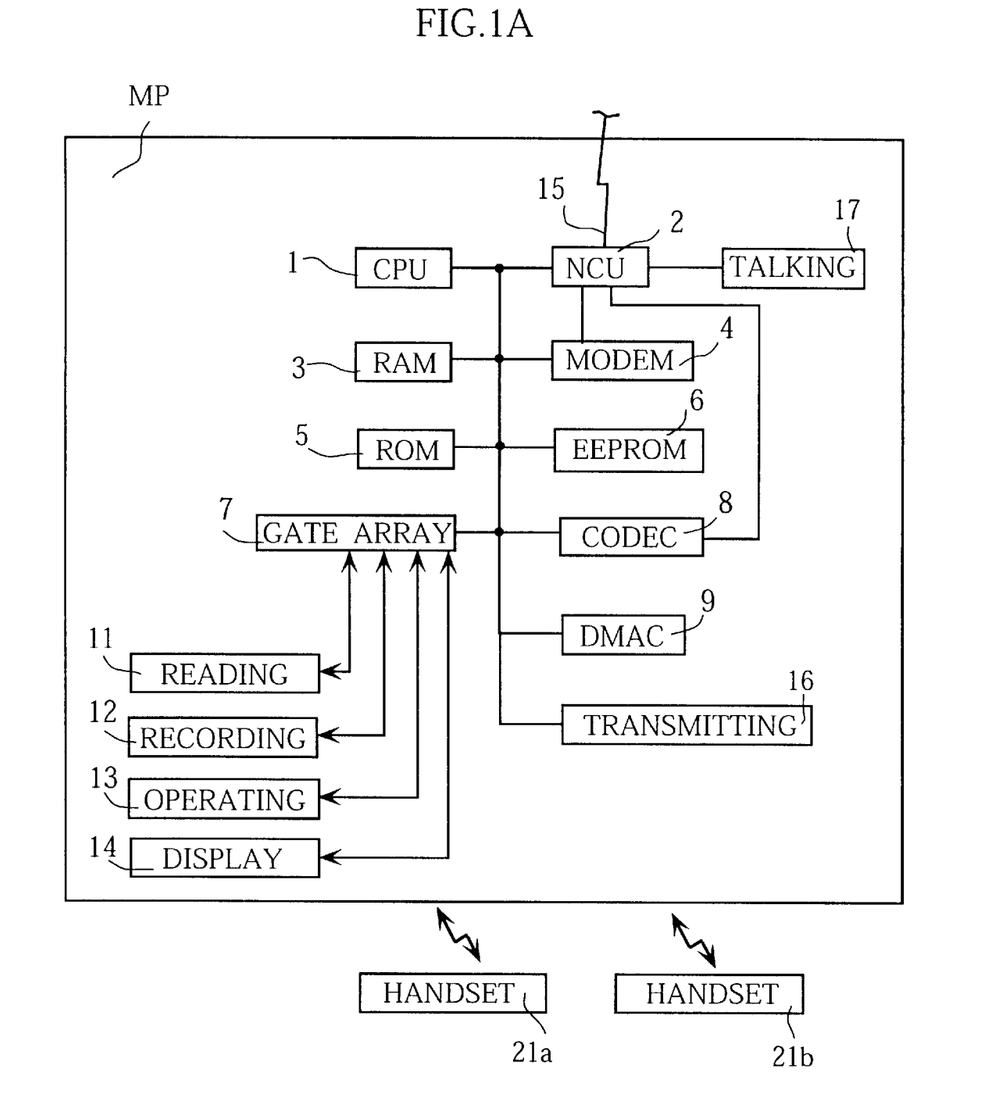
FIG. 1A is a block diagram showing principal components of a facsimile machine according to a first embodiment of the present invention.

Reference is first made to FIG. 1A which illustrates principal components of a facsimile machine according to a first embodiment of the present invention. As is shown, the facsimile machine includes a main phone denoted by MP and two cordless handsets 21a–21b. The main phone MP itself includes a handset (not shown) which may be physically connected to the main body of the facsimile machine via a handset cord. Supposing that the illustrated facsimile machine is owned by a family of four members consisting of e.g. parents and their daughter and son, the first handset 21a may be placed in a room of the daughter, whereas the second handset 21b may be placed in a room of the son.

As shown in FIG. 1A, the main phone MP includes a CPU (central processing unit) 1, a NCU (network control unit) 2, a RAM (random access memory) 3, a modem 4, a ROM (read only memory) 5, an EEPROM (electrically erasable and programmable read only memory) 6, a gate array 7, a codec 8, a DMAC (direct memory access controller) 9, a reading section 11, a recording section 12, an operating section 13, an displaying section 14, a transmitting section 16, and a talking section 17.

The CPU 1, the NCU 2, the RAM 3, the modem 4, the ROM 5, the EEPROM 6, the gate array 7, the codec 8, the DMAC 9 and the transmitting section 16 are connected to one another via bus lines. The bus lines include address bus lines, data bus lines and control signal lines. The gate array 7 is connected to the reading section 11, the recording section 12, the operating section 13 and the displaying section 14. The NCU 2 is connected to a telephone line 15, the modem 4, the codec 8 and the talking section 17.

The CPU 1 provides an overall control of the facsimile machine as a whole. The NCU 2 is connected to the telephone line 15 for providing network control.

The RAM 3 stores various kinds of data. The modem 4 modulates the codes to be transmitted and demodulates the received codes. The ROM 5 stores various programs and initial values.

The EEPROM 6 stores various flags such as initial value flags. The EEPROM 6 is provided with an identification data storage region having a predetermined memory capacity, as will be described later.

The gate array 7 functions as an I/O interface (input/output interface) for the CPU 1 for data transmission, while also performing various kinds of image and/or aural data processing. The codec 8 performs encoding of the facsimile data to be transmitted and decoding of the received facsimile data. Further, the codec 8 converts aural signals transmitted through the telephone line 15 into digital data, and performs the encoding of the digital data for output to the transmitting section 16. Still further, the codec 8 converts aural data (which is supplied to the transmitting section 16 from the handsets 21a–21b) into analog data, and performs the decoding of the analog data for output to the NCU 2.

The DMAC 9 provides memory access control with respect to the RAM 3, so that data is written in and/or read from the RAM 3.

The reading section 11 is provided with a light source, an image sensor and a paper feeding motor for example. The reading section 11 reads out a document for output of analog image signals. The recording section 12 is provided with a printing device such as an ink jet printer or a thermoelectronic printer. With the use of such a printing device, transmitted images or read-out images are printed on a recording paper sheet.

The operating section 13 is provided with a plurality of key switches, thereby enabling the user to perform various kinds of operations. The displaying section 14 is provided with an LCD (liquid crystal display). Under the control of the CPU 1, the LCD visually presents, for example, the telephone number of a caller. The transmitting section 16 exchange data with the cordless handsets 21a–21b by radio. The talking section 17 includes a handset (as is previously mentioned) by which the user of the facsimile machine can talk with the other party at the other end of the telephone line 15.

Figure 1B:
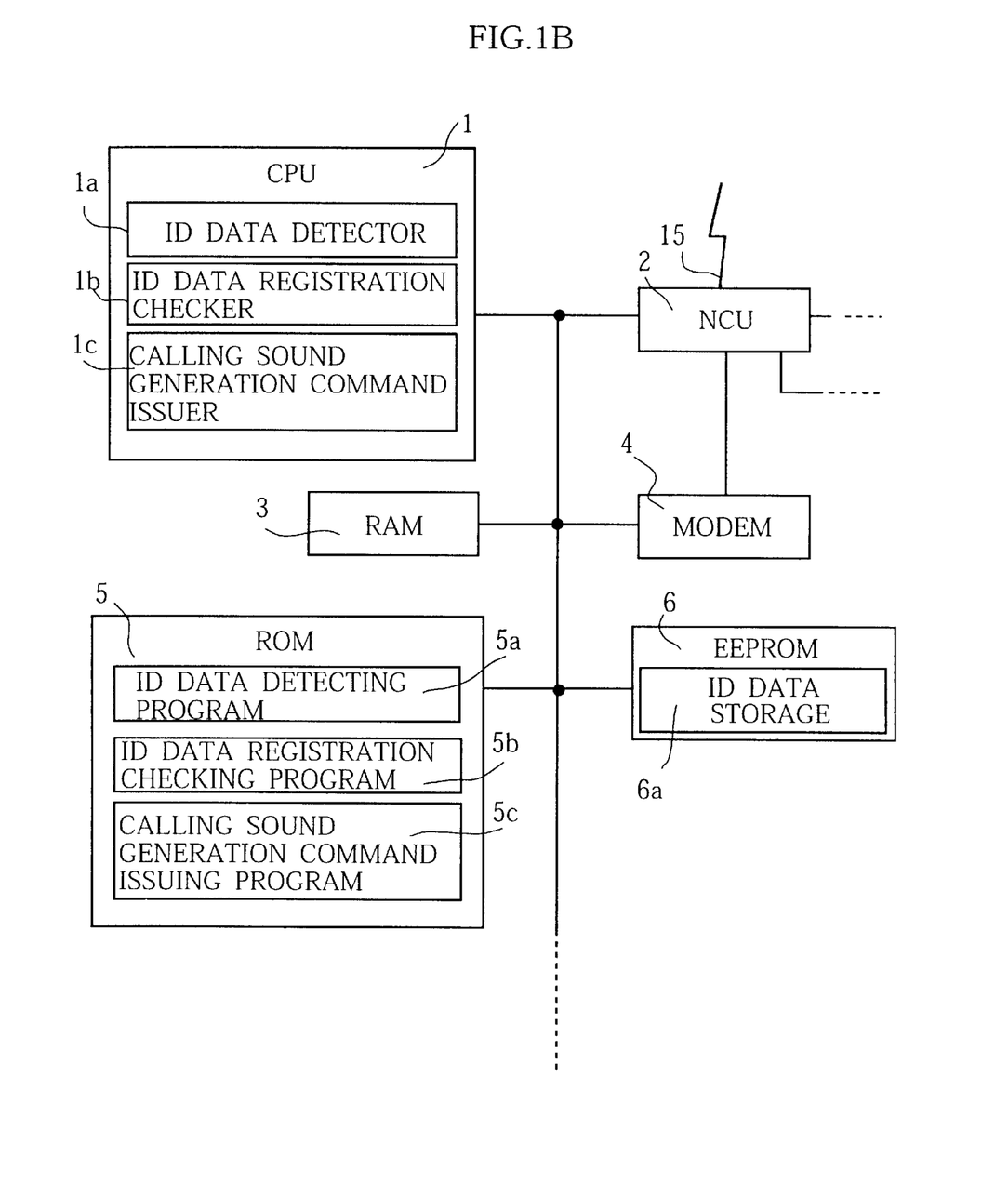
FIG. 1B shows details of some of the components of FIG. 1A.

As shown in FIG. 1B, the EEPROM 6 provided with an identification data storage 6a for storing identification data of external communication devices in a manner such that the identification data of each external communication device is linked to the identification data of one of the cordless handsets 21a–21b.

The CPU 1, which operates based on programs stored in the ROM 5, serves as an identification data detector 1a for detecting the identification data of a caller. Further, the CPU 1 serves as an identification data registration checker 1b for determining whether or not the identification data detected by the identification data detector 1a is registered in the identification data storage 6a of the EEPROM 6. Still further, the CPU 1, which cooperates with the transmitting section 16, serves as a calling sound generation command issuer 1c. With this arrangement, when it is found that the identification data of the caller is found to be registered in the ID data storage 6a and that the identification data is linked to one of the cordless handsets 21a–21b (say, the first handset 21a), the calling sound generation command issuer 1c issues a command to cause only the first handset 21a to ring.

As also shown in FIG. 1B, the ROM 5 holds an identification data detecting program 5a for detecting the identification data of a caller. Further, the ROM 5 holds an identification data registration checking program 5b for checking if the detected identification data of the caller is registered in the identification data storage 6a of the EEPROM 6. Still further, the ROM 5 holds a calling sound generation command issuing program 5c. With this arrangement, when it is found that the identification data of the caller is found to be registered in the ID data storage 6a and that the identification data is linked to one of the cordless handsets 21a–21b (say, the first handset 21a), only the first handset 21a is caused to ring under the control of the calling sound generation command issuing program 5c.

Figure 2:
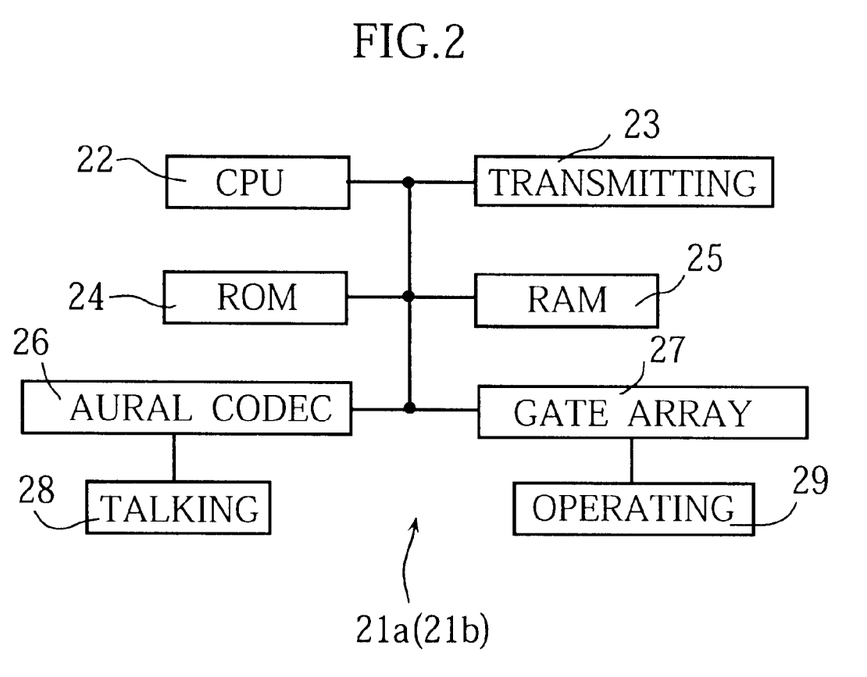
FIG. 2 is a block diagram showing principal components of a cordless handset of the facsimile machine of the first embodiment.

Reference is now made to FIG. 2 which is a block diagram showing principal components of the handset 21a (and 21b). As illustrated, the handset 21a includes a CPU 22, a transmitting section 23, a ROM 24, a RAM 25, a codec for aural signals, a gate array 27, a talking section 28, and an operating section 29.

The CPU 22, the transmitting section 23, the ROM 24, the RAM 25, the aural codec 26 and the gate array 27 are connected to one another via bus lines. The bus lines include address bus lines, data bus lines, and control signal lines. The codec 26 is connected to the talking section 28, while the gate array 27 is connected to the operating section 29.

The CPU 22 provides an overall control of the handset 21a as a whole. The transmitting section 23 exchange data with the transmitting section 16 of the main phone MP by radio.

The ROM 24 stores various kinds of programs and initial setting values. The RAM 25 stores various kinds of data. The aural codec 26 converts aural analog signals from the talking section 28 into digital data, while also performing the encoding of the digital data for output to the transmitting section 23. Further, the codec 26 converts aural digital data from the transmitting section 23 into analog signals, while also performing the decoding of the analog signals for output to the talking section 28.

The gate array 27 functions as an I/O interface (input/output interface) for the CPU 22 and the operating section 29. The talking section 28 enables the user to talk with the other party via the main phone MP. The operating section 29 is provided with key switches to be operated by the user for output of signals corresponding to the key operation.

Figure 3:
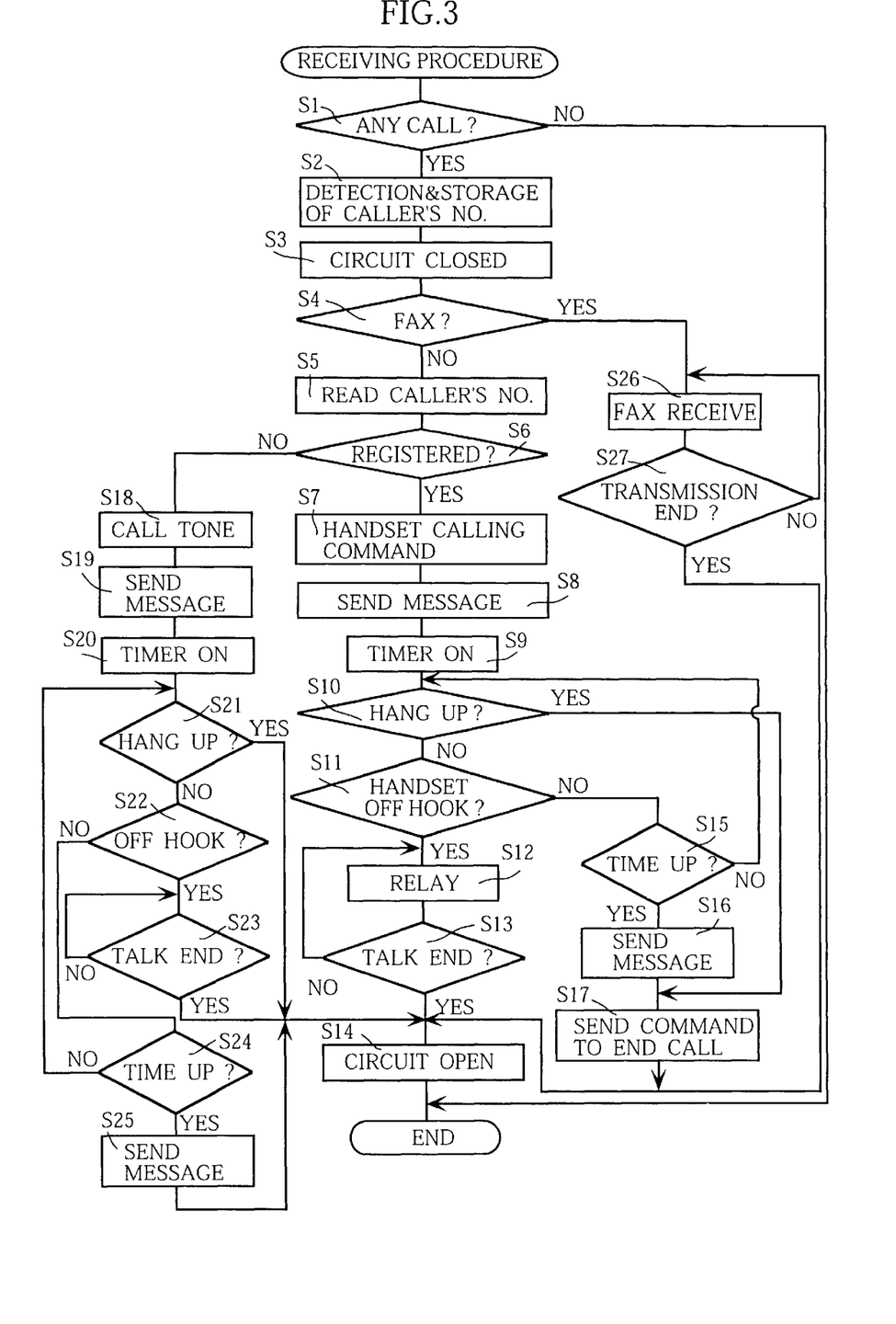
FIG. 3 is a flow chart illustrating various steps of a signal receiving procedure performed by a main phone of the same facsimile machine.

Referring to FIG. 3, a flow chart is provided for showing how a data receiving procedure is performed in the facsimile machine of the first embodiment. The data receiving procedure is performed repeatedly at predetermined intervals.

First, the CPU 1 determines whether or not a call is being made (S1). Specifically, the CPU 1 determines whether or not a calling signal is being supplied to the NCU 2 through the telephone line 15.

When there is a call being made (S1:YES), the CPU 1 extracts the telephone number of the caller and stores it. Specifically, based on the data coming from the modem 4, the CPU 1 extracts the telephone number of the caller from a caller ID which may be transmitted during lulls in the calling signal, and then the CPU 1 causes the telephone number to be stored in a certain region in the RAM 3. Then, the CPU 1 controls the NCU 2 for closing the circuit (S3). Then, the CPU 1 determines whether or not the received signals are of facsimile transmission (S4). Specifically, based on the data coming from the modem 4, the CPU 1 determines if the communication device of the other party is a facsimile machine or a telephone.

When it is found that the device of the other party is not a facsimile machine (S4:NO), the CPU 1 reads out the caller's telephone number (S5) which was stored in the RAM 3 at the step S2, and checks whether or not the read-out telephone number is registered in the identification data storage 6a of the EEPROM 6 (S6)

Here, if a telephone number is registered in the identification data storage 6a, the registration is performed in a manner such that the telephone number is linked to (associated with) a reference number belonging to one of the two cordless handsets 21a–21b. For instance, supposing that the first handset 21a is assigned "1" as its reference number and the second handset 21b is assigned "2" as its reference number, the telephone number of "Mr. A" may be registered in the identification data storage 6a while being linked to 1, whereas the telephone number of "Mr. B" may be registered in the same storage but linked to 2.

When it is found that the read-out telephone number is registered in the identification data storage 6a (S6:YES), the CPU 1 reads out the reference number of the handset which corresponds to the read-out telephone number. Then, under the control of the CPU 1, a command is issued for causing the corresponding handset to ring (S7). Specifically, while controlling the transmitting section 16, the CPU 1 issues signals which carries the reference number of the handset to be selected and the command to cause only the selected handset to ring. These signals are transmitted to both of the handsets 21a–21b. In this manner, each of the handsets 21a–21b receives the signals from the transmitting section 16 via the transmitting section 23 of the handset. Thereafter, only the handset specified by the reference number will be actuated to ring.

The ringing operation for the specified handset proceeds as follows. The CPU 22 (see FIG. 2) controls the talking section 28 via the aural codec 26. Then, the CPU 22 causes the speaker (not shown) of the handset to be actuated for giving a calling sound. The calling sound may be repeatedly generated at predetermined intervals.

The calling sound will be stopped when the user of the selected handset answers the call or when the selected handset receives a command to stop the ringing operation from the main phone MP. For the purpose of issuing the sound-stopping command, the main phone MP is provided with a timer for regulating the duration of a calling sound. In this arrangement, the main phone MP sends the stopping command to the handset when a predetermined calling duration expires. In addition, the main phone MP will also send the stopping command when the caller hangs up before the user of the handset answers the call.

After performing the step S7, the CPU 1 causes an aural message to be sent to the caller (S8). For performing this function, the CPU 1 reads out data corresponding to one of the several messages stored in a response message storage in the EEPROM 6. The read-out data is decoded and converted to analog data by the codec 8. The analog data is sent out through the telephone line 15 via the NCU 2. As a result, the caller may hear prerecorded messages such as "Thank you for calling. Your party is being called now. Please hold the line for a while."

Then, the CPU 1 starts the timer (S9) for regulating the duration of the calling sound. The timer may be realized by hardware or software. By software, use may be made of a downcounter which is designed for counting the system clock. The duration to be counted may be varied by altering the setting value under the control of the CPU 1.

Then, the CPU 1 determines whether or not the caller hangs up (S10). Specifically, based on the state of the signals supplied to the NCU 2 via the telephone line 15, the CPU 1 checks if the caller hangs up or not.

When the telephone line is not disconnected (S10:NO), the CPU 1 determines whether or not the specified cordless handset is removed off the hook (i.e., picked up). Specifically, based on the signals transmitted from the selected handset (the signals here are received by the transmitting section 16), the CPU 1 determines whether or not the user of the handset has answered the call.

When the specified handset is picked up (S11:YES), the CPU 1 relays the data transmission between the telephone line 15 and the specified cordless handset (S12). Specifically, under the control of the CPU 1, the codec 8 converts the caller's aural signals (which are supplied to the NCU 2 via the telephone line 15) to digital signals, while also encoding the digital signals. Then, the encoded digital signals are transmitted to the specified handset via the transmitting section 16. Then, under the control of the CPU 22 of the handset, the aural codec 26 decodes the aural data received via the transmitting section 23, while also converting the decoded data to analog signals. Then, the analog signals are supplied to the talking section 28 for actuating the speaker.

Under the control of the CPU 22 of the specified handset, the aural codec 26 converts the aural signals from the talking section 28 to digital signals, while also encoding the digital signals. Then, the aural digital signals are transmitted to the main telephone MP via the transmitting section 23. Thereafter, under the control of the CPU 1 of the main phone MP, the codec 8 decodes the aural signals received in the transmitting section 16, while also converting the decoded signals to analog signals. These analog signals are sent out through the telephone line 15 via the NCU 2.

Then, the CPU 1 determines whether or not the talk is finished (S13). Specifically, the CPU 1 checks if the user of the handset or the caller hangs up. Whether or not the user of the handset hangs up can be known from the signals transmitted from the specified cordless handset. Similarly, whether or not the caller hangs up can be know from the state of the signals supplied to the NCU 2 via the telephone line 15.

When the talk is finished (S13:YES), the NCU 2 opens the circuit (S14) under the control of the CPU 1. Thus, the data receiving procedure comes to an end.

At the step S13, when the talk is not finished (S13:NO), the CPU 1 goes back to the step S12. As a result, the talk between the caller and the user of the handset continues.

At the step S11, when the user of the handset does not answer the call (S11:NO), the CPU 1 checks if the predetermined duration set by the timer (see S9) has expired (S15).

When the predetermined time is up (S15:YES), certain response messages are sent out (S16) under the control of the CPU 1. Specifically, first the CPU 1 reads out data stored in the response message storage in the EEPROM 6. Then, under the control of the CPU 1, the codec 8 performs the decoding of the read-out data and converts the decoded data to analog data. Then, this analog data is sent out through the telephone line 15 via the NCU 2. As a result, the caller at the other end of the line will hear messages such as "Thank you for calling. No one is available now. Sorry to bother you, but please call again at a later time".

Then, the CPU 1 sends a calling sound termination command (S17) and proceeds to the step S14. Specifically, under the control of the CPU 1, the transmitting section 16 sends a command for stopping the ringing of the cordless handset. This command will be received in the transmitting section 23 of the handset. As a result, the CPU 22 of the handset controls the transmitting section 23 via the aural codec 26, thereby stopping the calling sound of the handset.

At the step S15, when the predetermined time duration has not been up yet (S15:NO), the CPU 1 goes back to the step S10, letting the calling sound continue to be generated.

At the step 10, when the telephone line is disconnected (S10:YES), the CPU 1 proceeds to the step S17.

At the step S6, when the telephone number of the caller is not registered in the identification data storage 6a of the EEPROM 6 (S6:NO), the CPU 1 causes the main phone MP to generate calling sounds (S18). Specifically, the CPU 1 controls the talking section 17 via the codec 8, thereby letting the calling sounds be issued from the speaker (not shown) of the talking section 17.

Then, the CPU 1 sends certain messages to the caller (S19). Specifically, first the CPU 1 reads out data stored in the response message storage in the EEPROM 6. Then, under the control of the CPU 1, the codec 8 performs the decoding of the read-out data and converts the decoded data to analog data. Then, this analog data is sent out through the telephone line 15 via the NCU 2. As a result, the caller at the other end of the line will hear messages such as "Thank you for calling. Your party is being called now. Please hold the line for a while."

Then, the CPU 1 actuates the timer for monitoring the duration of the calling sound (S20). Then, the CPU 1 determines whether or not the telephone line is disconnected (S21). Specifically, based on the state of the signals supplied to the NCU 2 through the telephone line 15, the CPU 1 checks if the caller hangs up or not.

When the telephone line is not disconnected (S21:NO), the CPU 1 determines whether or not the handset of the main phone MP is lifted (S22). Specifically, based on the signals coming from a switch hook of the talking section 17, the CPU 1 determines if the user of the main phone has answered the call.

When the handset of the main phone is lifted (S22:YES), the CPU 1 determines whether or not the conversation is finished (S23). Specifically, the CPU 1 checks if the user of the main phone or the other party hangs up the phone. Whether or not the user of the main phone hangs up can be known from the signals coming from the switch hook of the talking section 17. Whether or not the other party hangs up can be known from the state of the signals supplied to the NCU 2 through the telephone line 15.

When the conversation is finished (S23:YES), the CPU 1 proceeds to the step S14.

At the step 23, when the conversation is not finished (S23:NO), the CPU 1 goes back to the step S23, thereby letting the conversation continue.

At the step S22, when the handset of the main phone is not lifted (S22:NO), in other words, when the user of the main phone does not answer the call, the CPU 1 determines whether the predetermined time duration regulated by the timer expires or not (S24).

When the predetermined time duration is up (S24:YES), the CPU 1 causes certain response messages to be sent (S25) and proceeds to the step S14. Specifically, first the CPU 1 reads out data stored in the response message storage in the EEPROM 6. Then, under the control of the CPU 1, the codec 8 performs the decoding of the read-out data and converts the decoded data to analog data. Then, this analog data is sent out through the telephone line 15 via the NCU 2. As a result, the caller at the other end of the line will hear messages such as "Thank you for calling. No one is available now. Sorry to bother you, but please call again at a later time".

At the step S24, when the predetermined time duration has not been up yet (S24:NO), the CPU 1 goes back to the step S21, thereby continuing the generation of the calling sounds.

At the step S21, when the telephone line is disconnected (S21:YES), the CPU 1 goes to the step S14.

At the step S4, when it is a facsimile transmission (S4:YES), the CPU 1 performs well-known processing for facsimile data transmission (S26). Then, the CPU 1 determines whether the data transmission is finished or not (S27). When the data transmission is finished (S27:YES), the CPU 1 goes to the step S14. When it is not finished (S27:NO), the CPU 1 goes back to the step S26, thereby letting the facsimile data transmission continue.

At the step S1, when there is no call being made (S1:NO), the data receiving procedure comes to an end.

In the first embodiment described above, the identification data of a plurality of callers are stored in the EEPROM 6 of the main phone MP. According to the present invention, however, other arrangements are possible, as described below.

Figure 4A:
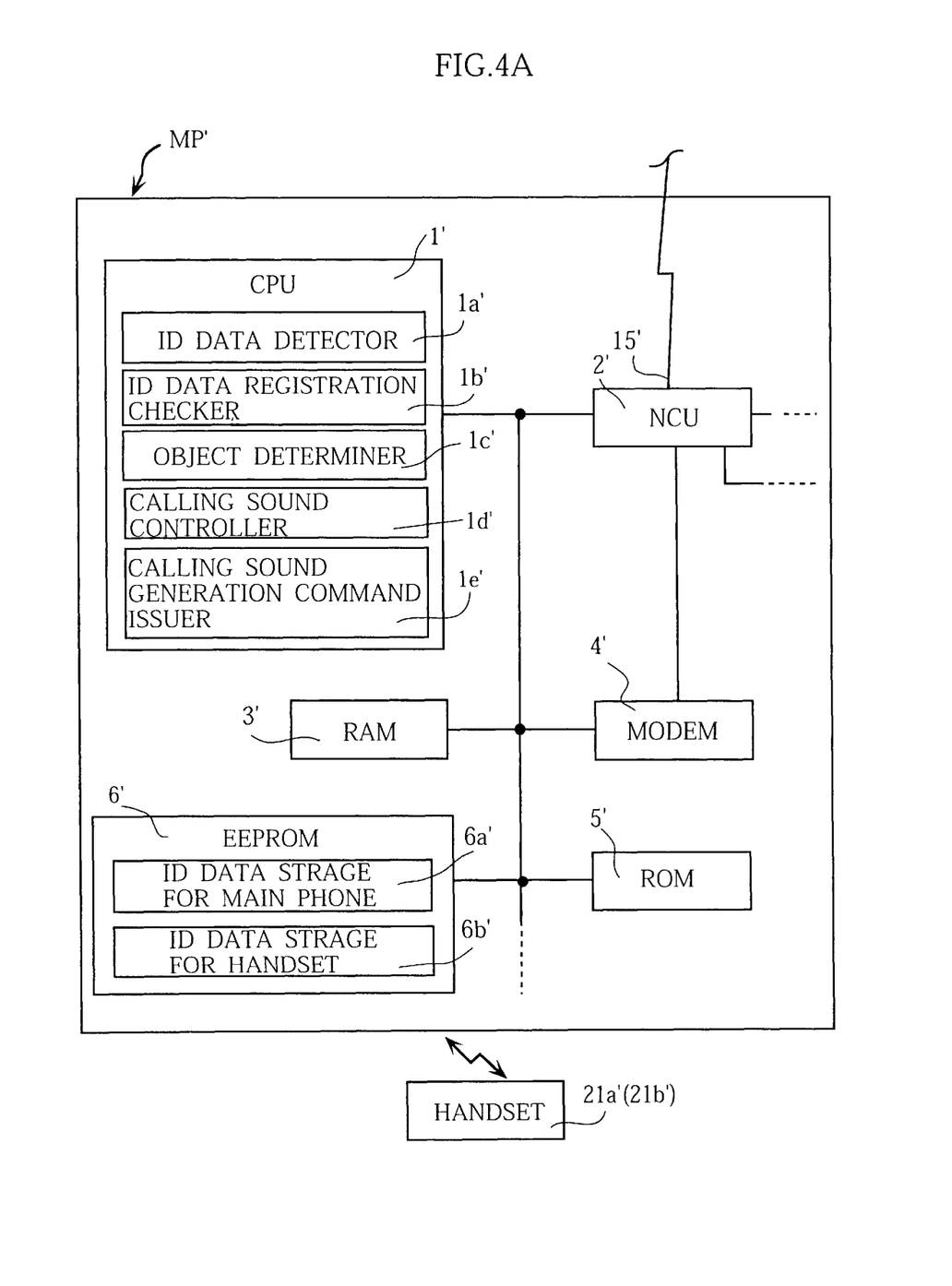
FIG. 4A is a block diagram showing principal components of a facsimile machine according to a second embodiment of the present invention.

Reference is now made to FIG. 4A schematically showing a facsimile machine according to a second embodiment of the present invention. In this embodiment again, the facsimile machine includes a main phone MP' and two cordless handsets 21a' and 21b' (only one is shown).

Like in the first embodiment, the main phone MP' includes a CPU 1', a NCU 2', a RAM 3', a modem 4', a ROM 5', an EEPROM 6' and so on. As shown in FIG. 4A, the CPU 1' is provided with an identification data detector 1a', an identification data registration checker 1b', an actuation object determiner 1c', a calling sound controller 1d' and a calling sound generation command issuer 1e'. The EEPROM 6' is provided with an identification data storage 6a' for the main phone and an identification data storage 6b' for the handsets.

In the above arrangement, the ID data storage 6a' of the EEPROM 6' stores identification data of callers in a manner such that the identification data is linked to the main phone, whereas the other ID data storage 6b' stores identification data of some other callers in a manner such that the identification data is linked to the handsets 21a'–21b'. For instance, the telephone number (a typical example of the identification data) of an X company may be stored in the ID data storage 6a', whereas the telephone number of Mr. Y may be stored in the ID data storage 6b'. In the latter case, Mr. Y's telephone number is linked to either one of the handsets 21a' and 21b'.

According to the second embodiment, the identification data of a caller, which is supplied to the NCU 2' through the telephone line 15', is detected by the identification data detector 1a'. Then, the identification data registration checker 1b' determines whether or not the detected identification data is registered in the EEPROM 6'. When the detected ID data is found to be registered, the object determiner 1c' determines which unit (i.e., the main phone MP' or the first handset 21a' or the second handset 21b') the detected ID data is linked to. When the detected ID data is found to be linked to the main phone MP', then the calling sound controller 1d' causes the main phone to generate calling sounds. On the other hand, when the detected ID data is found to be linked to the first handset 21a' for example, the calling sound generation command issuer 1e' sends out a command to the first handset so that only the first handset will generate calling sounds.

Figure 4B:
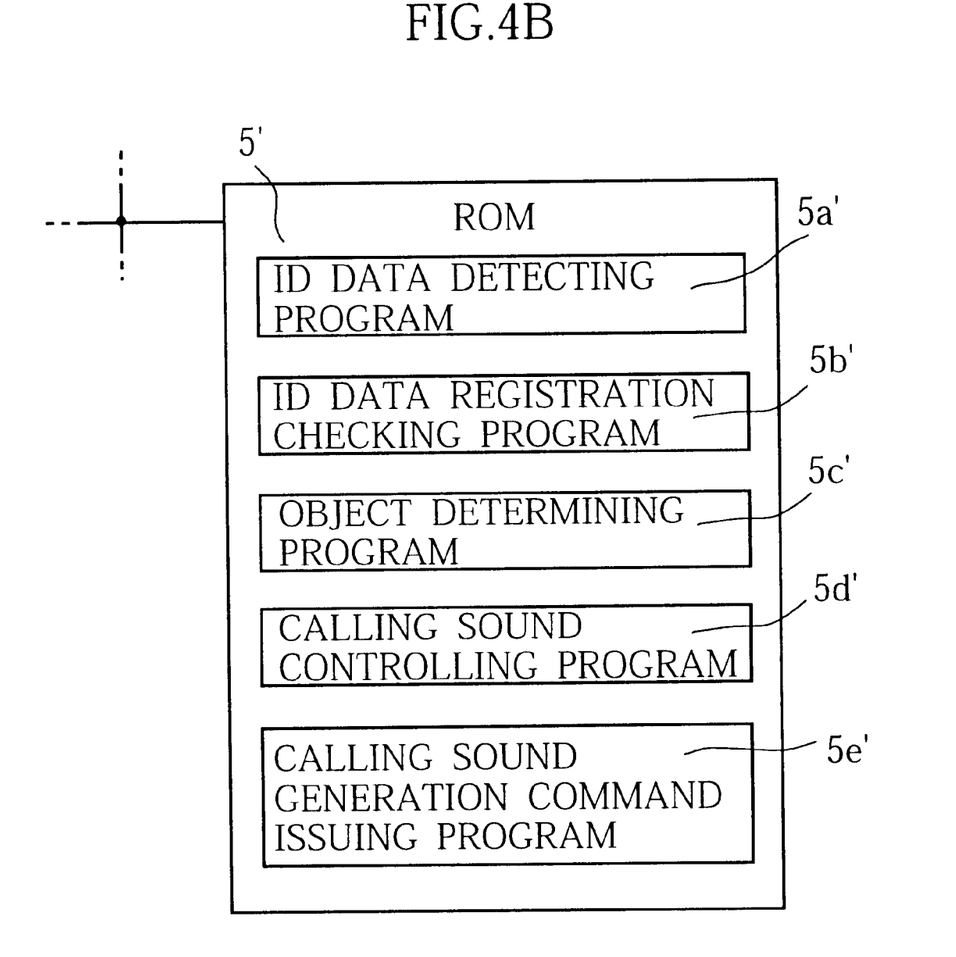
FIG. 4B is an enlarged view schematically showing various programs stored in a read only memory for the facsimile machine of the second embodiment.

For performing the operations stated above, the ROM 5' holds various kinds of programs, as shown in FIG. 4B. Specifically, the ROM 5' stores an identification data detecting program 5a', an identification data registration checking program 5b', an object determining program 5c', a calling sound controlling program 5d' and a calling sound generation command issuing program 5e'.

The identification data detecting program 5a' is provided for detecting the identification data of a caller. The identification data registration checking program 5b' is provided for determining whether or not the detected identification data of the caller is registered in the EEPROM 6' in a manner such that the identification data of the caller is linked to one of the cordless handsets 21a'–21b' and the main phone MP'. The object determining program 5c' is provided for determining which unit (namely, the main phone MP' or the first handset 21a' or the second handset 21b') the detected identification data is linked to. The calling sound controlling program 5d' is provided for causing the main phone MP' to ring when it is found that the detected identification data is linked to the main phone MP'. Finally, the calling sound generation command issuing program 5e' is provided for issuing a command to cause only a corresponding one of the cordless handsets 21a'–21b' to ring when it is found that the detected identification data is linked to the corresponding one of the handsets.

Figure 5:
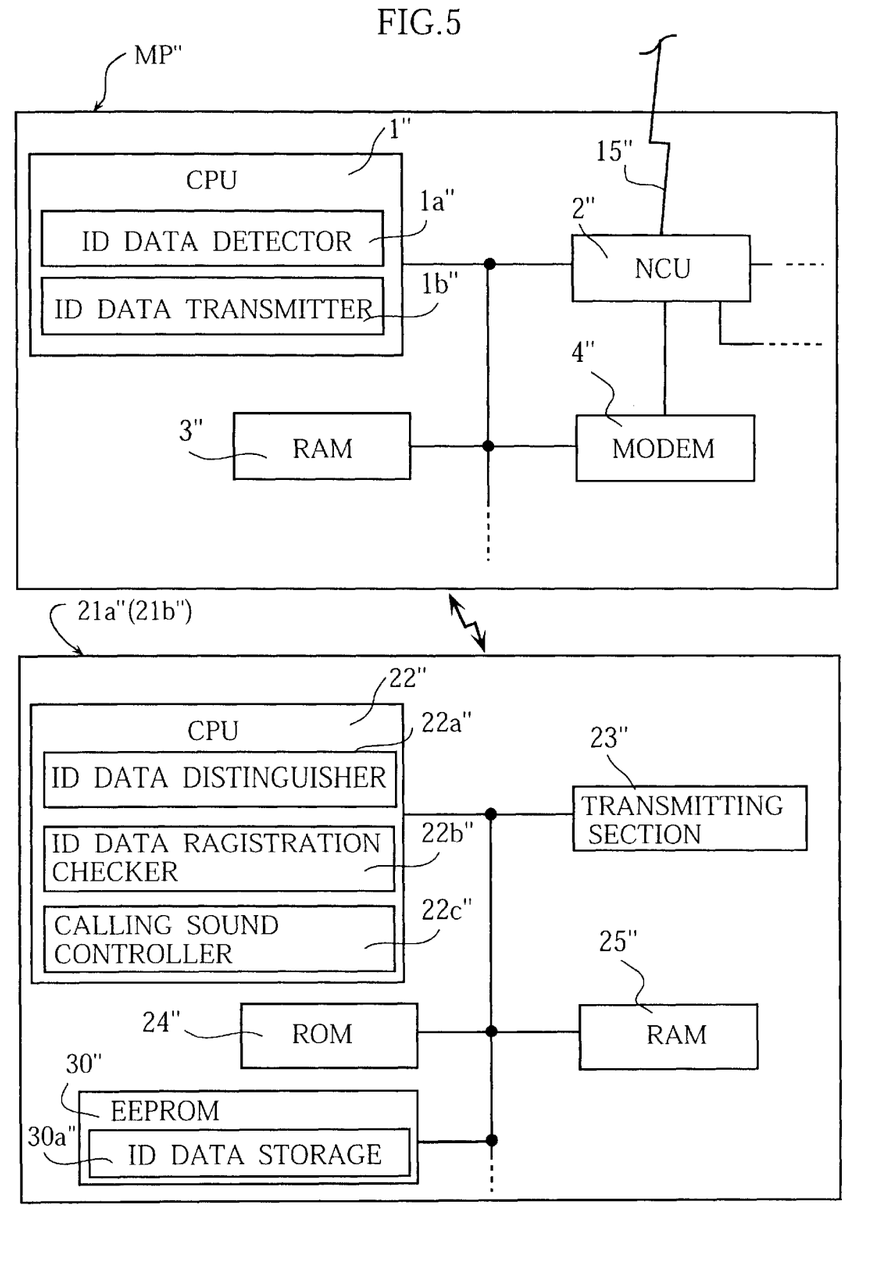
FIG. 5 is a block diagram schematically showing principal components of a facsimile machine according to a third embodiment of the present invention.

Referring to FIG. 5, a facsimile machine according to a third embodiment of the present invention is shown. Like in the first embodiment, the illustrated facsimile machine includes a main phone MP" and two cordless handsets 21a"–21b" (only one is shown).

According to the third embodiment, like in the first embodiment, the main phone MP" includes a CPU 1", an NCU 2", a RAM 3", a MODEM 4", and so on. As is shown, the CPU 1" is provided with an identification data detector 1a" and an identification data transmitter 1b".

The cordless handset 21a" (21b") includes a CPU 22", a transmitting section 23", a ROM 24", a RAM 25", an EEPROM 30", and so on. As is shown, the CPU 22" is provided with an identification data distinguisher 22a", an identification data registration checker 22b" and a calling sound controller 22c". The EEPROM 30" is provided with an identification data storage 30a".

Unlike the first embodiment, in this third embodiment, the identification data of a plurality of callers are stored in the identification data storage 30a" in the EEPROM 30" which is arranged in each of the handsets 21a"–21b".

The operations in the facsimile machine of the third embodiment are performed as follows.

In general, when a calling signal is supplied to the main phone MP" via a telephone line 15", the telephone number of the caller is transmitted to all of the cordless handsets 21a"–21b". Then, in each of the handsets, it is determined whether or not the transmitted telephone number is registered in the identification data storage 30a". When the telephone number is found to be registered, for example, in the first handset 21a" but not in the second handset 21b", then only the first handset 21a" will be actuated to ring.

The identification data detector 1a" of the main phone MP" is provided for detecting the identification data (e.g. telephone number) of the caller. Thus detected identification data is transmitted to the handsets 21a" and 21b" under the control of the identification data transmitter 1b".

In each of the handsets, the identification data transmitted from the main phone MP" is distinguished from other signals by the identification data distinguisher 22a". Then, the identification data registration checker 22b" determines whether or not the transmitted identification data is registered in the identification data storage 30a". When it is found that the identification data is registered in the storage 30a", the calling sound controller 22c" will cause the handset to ring.

With such an arrangement, when the transmitted telephone number is not registered in any one of the handsets 21a" and 21b", no calling sound will be generated at the handsets. To avoid such an inconvenience, arrangements may be made so that each handset will transmit certain signals to the main phone MP", notifying that the identification data is not registered. After being thus informed, the main phone MP" itself may generate calling sounds. Alternatively, under the control of the main phone MP", the main phone and all of the handsets 21a"–21b" may be actuated to generate calling sounds.

As an modification of the illustrated arrangements, the main phone MP" may include an EEPROM provided with an identification data storage for registering telephone numbers of a suitable number of callers.

Figure 6:
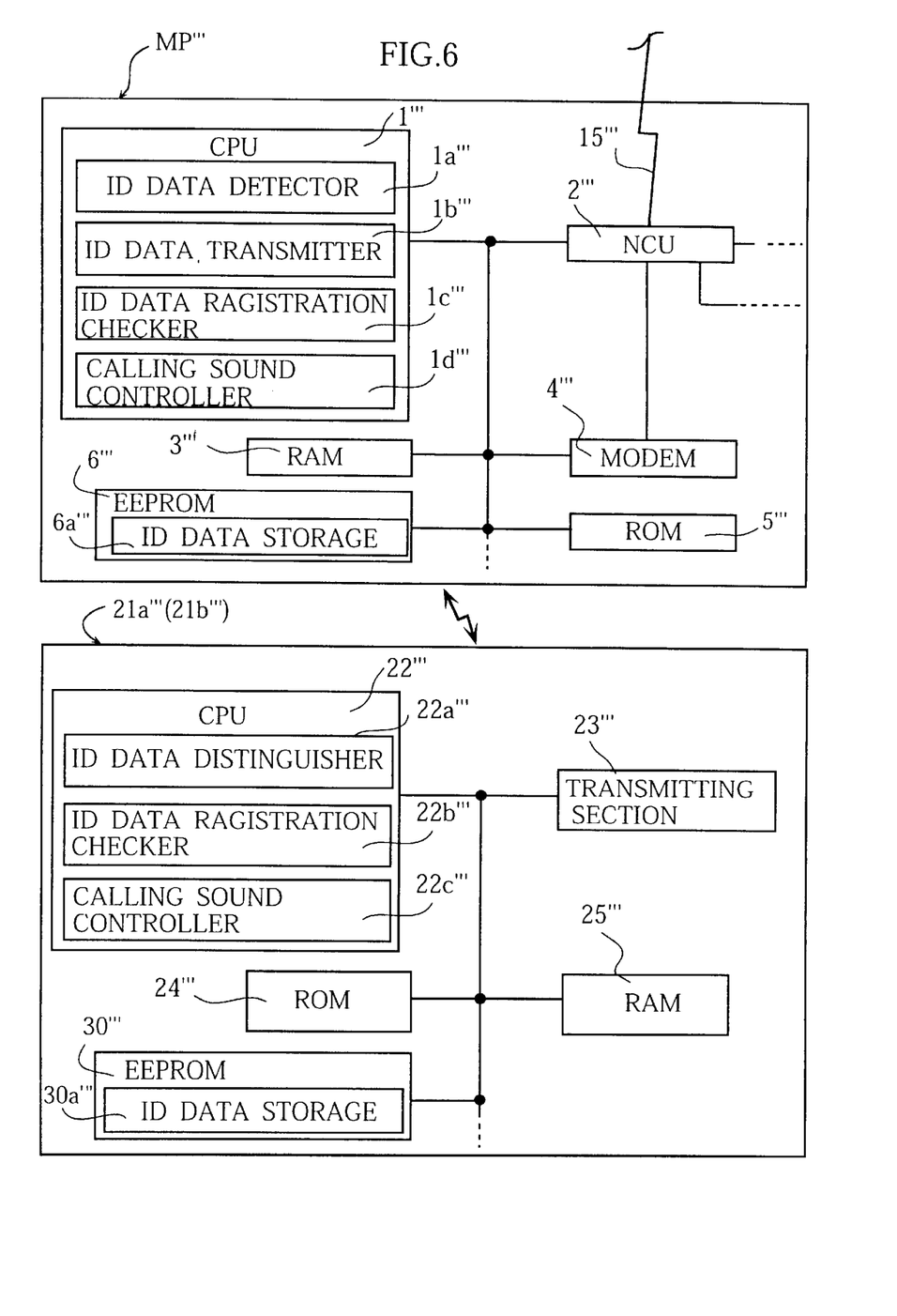
FIG. 6 is a block diagram schematically showing principal components of a facsimile machine according to a fourth embodiment of the present invention.

Reference is now made to FIG. 6 schematically showing a facsimile machine according to a fourth embodiment of the present invention. Like the previous embodiments, the illustrated facsimile machine includes a main phone MP''' and two cordless handsets 21a''' and 21b''' (only one is shown).

The main phone MP''' includes a CPU 1''', a NCU 2''', a RAM 3''', a modem 4''', a ROM 5''', an EEPROM 6''' and so on. The handset 21a''' (21b''') includes a CPU 22''', a transmitting section 23''', a ROM 24''', a RAM 25''', an EEPROM 30''' and so on.

As is shown, the CPU 1''' is provided with an identification data detector 1a''', an identification data transmitter 1b''', an identification data registration checker 1c''' and a calling sound controller 1d'''. The EEPROM 6''' is provided with an identification data storage for the main phone MP'''.

The CPU 22''' of the handset 21a''' (21b''') is provided with an identification data distinguisher 22a''', an identification data registration checker 22b''' and a calling sound controller 22c'''. The EEPROM 30''' is provided with an identification data storage 30a'''.

The ID data detector 1a''' is provided for detecting the identification data of a caller which is supplied to the NCU 2''' via the telephone line 15'''. The detected identification data is transmitted to each of the handsets 21a''' and 21b''' under the control of the identification data transmitter 1b'''. The identification data registration checker 1c''' determines whether or not the detected identification data is registered in the identification data storage 6a''' of the EEPROM 6'''. When the data is found to be registered, the calling sound controller 1d''' causes the main phone MP''' to generate calling sounds.

Turning to the handset 21a''', when the detected identification data is transmitted from the main phone MP''' to the handset, the identification data distinguisher 22a''' distinguishes the identification data from other signals sent to the handset 21a'''. Then, the identification data registration checker 22b''' determines whether or not the distinguished identification data is registered in the identification data storage 30a''' of the EEPROM 30'''. When the data is found to be registered, the calling sound controller 22c''' causes the handset 21a''' to generate calling sounds.

In the above embodiments, the main phone and the cordless handsets may be arranged to give the same ringing sounds when a call is being made. Preferably, however, those ringing sounds may be different. For instance, the ringing sound of the main phone may be rendered different in tone from those of the first and second handsets. In a certain application, the ringing sound of the first handset may be the same as that of the second handset. Alternatively, the sound of the first handset may be rendered different from that of the second handset as well as from that of the main phone. In this case, it follows that the main phone, the first handset and the second handset are arranged to generate one of three different kinds of ringing sounds. With such an arrangement, each of the family members can easily know who a caller is hoping to talk with.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A communication apparatus for communicating with an external device via a line, the apparatus comprising:

a main unit functioning as a telephone or facsimile machine by itself; and a plurality of secondary units capable of communicating with the external device via the main unit;

wherein the main unit includes:

line-closing means for closing the line to allow the communication apparatus to start communicating with the external device;

an identification data storage for storing identification data of the external device in a manner such that the identification data is linked to one of the secondary units;

an identification data detector for detecting the identification data of the external device before the line is closed by the line-closing means;

an identification data registration checker for determining, after the line is closed by the line-closing means, whether or not the detected identification data is registered in the identification data storage; and a calling sound generation command issuer for causing said one of the secondary units to ring when the detected identification data is registered in the identification data storage.

2. The communication apparatus according to claim 1, wherein the main unit and the plurality of secondary units are arranged to generate ringing sounds different from one another.

3. The communication apparatus according to claim 1, wherein the main unit comprises an electrically erasable and programmable read only memory serving as the identification data storage.

4. The communication apparatus according to claim 1, wherein the main unit comprises a central processing unit serving as the identification data detector, the identification data registration checker and the calling sound generation command issuer.

5. The communication apparatus according to claim 1, wherein each of the secondary units is physically separated from the main unit.

6. The communication apparatus according to claim 1, wherein the identification data detector is arranged to detect a telephone number of the external device, the telephone number being contained in caller identification data.

7. The communication apparatus according to claim 1, wherein the communication apparatus comprises a facsimile machine.

8. A communication apparatus for communicating with an external device via a line, the apparatus comprising:
   a main unit; and
   at least one secondary unit capable of communicating with the external device via the main unit;
   wherein the main unit includes:
      line-closing means for closing the line to allow the communication apparatus to start communicating with the external device;
      an identification data storage for storing identification data of the external device in a manner such that the identification data is linked to either one of the main unit and the secondary unit;
      an identification data detector for detecting the identification data of the external device before the line is closed by the line-closing means;
      an identification data registration checker for determining, after the line is closed by the line-closing means, whether or not the detected identification data is registered in the identification data storage;
      an object determiner for determining whether the detected identification data is linked to the main unit or the secondary unit;
      a calling sound controller for causing the main unit to ring when the detected identification data is linked to the main unit; and
      a calling sound generation command issuer for causing only the secondary unit to ring when the detected identification data is linked to the secondary unit.

9. The communication apparatus according to claim 8, wherein the main unit and the secondary are arranged to generate ringing sounds different from each other.

10. The communication apparatus according to claim 8, wherein the main unit comprises an electrically erasable and programmable read only memory serving as the identification data storage.

11. The communication apparatus according to claim 8, wherein the main unit comprises a central processing unit serving as the identification data detector, the identification data registration checker, the object determiner, the calling sound controller and the calling sound generation command issuer.

12. A communication apparatus for communicating with an external device comprising:
   a main unit; and
   a plurality of secondary units capable of communicating with the external device via the main unit;
   wherein the main unit includes:
      an identification data detector for detecting identification data of the external device; and
      an identification data transmitter for sending the detected identification data of the external device to each of the secondary units; and
   wherein each of the secondary units includes:
      an identification data storage capable of storing the identification data of the external device;
      an identification data distinguisher for discerning the identification data transmitted from the identification data transmitter of the main unit;
      an identification data registration checker for determining whether or not the discerned identification data is registered in the identification data storage; and
      a calling sound controller for causing said each of the secondary units to ring when the discerned identification data is registered in the identification data storage.

13. The communication apparatus according to claim 12, wherein the main unit comprises a central processing unit serving as the identification data detector and the identification data transmitter.

14. The communication apparatus according to claim 12, wherein each of the secondary units comprises an electrically erasable and programmable read only memory serving as the identification data storage.

15. The communication apparatus according to claim 12, wherein each of the secondary units comprises a central processing unit serving as the identification data distinguisher, the identification data registration checker and the calling sound controller.

16. A communication apparatus for communicating with an external device comprising:
   a main unit; and
   at least one secondary unit capable of communicating with the external device via the main unit;
   wherein the main unit includes:
      a primary identification data storage capable of storing identification data of the external device;
      an identification data detector for detecting the identification data of the external device;
      an identification data transmitter for sending the detected identification data to the secondary unit;
      a primary identification data registration checker for determining whether or not the detected identification data is registered in the primary identification data storage; and
      a primary calling sound controller for causing the main unit to ring when the detected identification data is registered in the primary identification data storage; and
   wherein the secondary unit includes:
      a secondary identification data storage capable of storing the identification data of the external device;
      an identification data distinguisher for discerning the identification data transmitted from the identification data transmitter of the main unit;

a secondary identification data registration checker for determining whether or not the discerned identification data is registered in the secondary identification data storage; and a secondary calling sound controller for causing the secondary unit to ring when the discerned identification data is registered in the secondary identification data storage.

17. The communication apparatus according to claim 16, wherein the main unit comprises an electrically erasable and programmable read only memory serving as the primary identification data storage, the main unit further comprising a central processing unit serving as the identification data detector, the identification data transmitter, the primary identification data registration checker and the primary calling sound controller.

18. The communication apparatus according to claim 16, wherein the secondary unit comprises an electrically erasable and programmable read only memory serving as the secondary identification data storage, the secondary unit further comprising a central processing unit serving as the identification data distinguisher, the secondary identification data registration checker and the secondary calling sound controller.

19. A storage medium for storing programs for controlling a main unit of a communication apparatus which is capable of communicating with an external device via a line and provided with an identification data storage for storing identification data of the external device, the main unit functioning as a telephone or facsimile machine by itself, the communication apparatus including a plurality of secondary units which are physically separated from the main unit, the storage medium comprising:

a line closing program for closing the line to allow the communication apparatus to start communicating with the external device;

an identification data detecting program for detecting the identification data of the external device before the line is closed by the line closing program;

an identification data registration checking program for determining, after the line is closed by the line closing program, whether or not the detected identification data of the external device is registered in the identification data storage in a manner such that the identification data is linked to one of the plurality of secondary units; and a calling sound generation command issuing program for issuing a command to cause said one of the plurality of secondary units to ring when the detected identification data is registered in the identification data storage.

20. A storage medium for storing programs for controlling a main unit of a communication apparatus which is capable of communicating with an external device via a line and provided with an identification data storage for storing identification data of the external device, the communication apparatus including at least one secondary unit which is physically separated from the main unit, the storage medium comprising:

a line closing program for closing the line to allow the communication apparatus to start communicating with the external device;

an identification data detecting program for detecting the identification data of the external device before the line is closed by the line closing program;

an identification data registration checking program for determine, after the line is closed by the line closing program, whether or not the detected identification data of the external device is registered in the identification data storage in a manner such that the identification data of the external device is linked to one of the main unit and the secondary unit;

an object determining program for determining whether the detected identification data of the external device is linked to the main unit or the secondary unit;

a calling sound controlling program for causing the main unit to ring when the detected identification data of the external device is lined to the main unit; and a calling sound generation command issuing program for issuing a command to cause the secondary unit to ring when the detected identification data of the external device is linked to the secondary unit.

21. The communication apparatus according to claim 1, further comprising a calling sound controller for causing the main unit to ring when the detected identification data is not registered in the identification data storage.

22. The communication apparatus according to claim 7, further comprising data distinguishing means for identifying a type of data supplied from the external device after the line is closed, wherein when the data distinguishing means determines that the supplied data is facsimile data, the main unit subjects the facsimile data to facsimile data processing.

23. The communication apparatus according to claim 8, wherein the main unit functions as a telephone or facsimile machine by itself.

24. The communication apparatus according to claim 12, wherein the main unit functions as a telephone or facsimile machine by itself.

25. The communication apparatus according to claim 16, wherein the main unit functions as a telephone or facsimile machine by itself.

26. The communication apparatus according to claim 21, further comprising first means for sending a first response message to the external device while the calling sound controller causes the main unit to keep ringing.

27. The communication apparatus according to claim 26, further comprising: a first timer for determining if a predetermined time period has passed after the main unit is started to ring by the calling sound controller; and a first off-hook detector for determining whether or not a handset of the main unit is off-hook; wherein the main unit starts aural data communication with the external device when the first off-hook detector detects the off-hook state of the handset before the predetermined time period has passed.

28. The communication apparatus according to claim 27, further comprising second means for sending a second response message to the external device when the first off-hook detector does not detect the off-hook state of the handset after the predetermined time period has passed.

29. The communication apparatus according to claim 28, further comprising line releasing means for releasing the line to terminate the communication between the communication apparatus and the external device, wherein the line-releasing means releases the line after the second means sends the second response message to the external device.

30. The communication apparatus according to claim 1, further comprising third means for sending a third response message to the external device while the calling sound generation command issuer is sending a ring command to said one of the secondary units.

31. The communication apparatus according to claim 30, further comprising: a second timer for determining if a predetermined time period has passed after the calling sound generation command issuer starts sending the ring command to said one of the secondary units; and a second off-hook detector for determining whether or not said one of the secondary units is off-hook; wherein when the second off-hook detector detects the off-hook state of said one of the secondary units before the predetermined time period has passed, said one of the secondary units starts aural data communication with the external device.

32. The communication apparatus according to claim 31, further comprising fourth means for sending a fourth response message to the external device when the second off-hook detector does not detect the off-hook state of said one of the secondary units after the predetermined time period has passed.

33. The communication apparatus according to claim 32, further comprising line-releasing means for releasing the line to terminate the communication between the communication apparatus and the external device, wherein the line-releasing means releases the line after the fourth means sends the fourth response message to the external device.

34. A communication apparatus for communicating with an external device via a line, the apparatus comprising:
    a main unit; and
    at least one secondary unit capable of communicating with the external device via the main unit;
    wherein the main unit includes:
        line-closing means for closing the line to allow the communication apparatus to start communicating with the external device;
        an identification data storage for storing identification data of the external device in a manner such that the identification data is linked to at least one of the main unit and the secondary unit;
        an identification data detector for detecting the identification data of the external device before the line is closed by the line-closing means;
        an identification data registration checker for determining, after the line is closed by the line-closing means, whether or not the detected identification data is registered in the identification data storage;
        an object determiner for determining whether the detected identification data is linked to the main unit or the secondary unit; and
        a calling sound controller for causing a selected one of the main unit and the secondary unit to ring, said selected one being linked to the detected identification data.

35. The communication apparatus according to claim 34, wherein the communication apparatus is a facsimile machine.

36. The communication apparatus according to claim 35, further comprising data distinguishing means for identifying a type of data supplied from the external device after the line is closed, wherein when the data distinguishing means determines that the supplied data is facsimile data, the main unit subjects the facsimile data to facsimile data processing.

37. The communication apparatus according to claim 34, further comprising first means for sending a first response message to the external device while the calling sound controller causes said selected one of the main unit and the secondary unit to keep ringing.

38. The communication apparatus according to claim 37, further comprising: a timer for determining if a predetermined time period has passed after said selected one of the main unit and the secondary unit is started to ring by the calling sound controller; and an off-hook detector for determining whether or not said selected one of the main unit and the secondary unit is off-hook; wherein said selected one of the main unit and the secondary unit starts aural data communication with the external device when the off-hook detector detects the off-hook state of said selected one before the predetermined time period has passed.

39. The communication apparatus according to claim 38, further comprising second means for sending a second response message to the external device when the off-hook detector does not detect the off-hook state of said selected one after the predetermined time period has passed.

40. The communication apparatus according to claim 39, further comprising line-releasing means for releasing the line to terminate the communication between the communication apparatus and the external device, wherein the line-releasing means releases the line after the second means sends the second response message to the external device.

41. The communication apparatus according to claim 12, wherein at least one of the main unit and the secondary units is caused to ring when the discerned identification data is not registered in any one of the secondary units.

42. The communication apparatus according to claim 16, wherein at least one of the main unit and the secondary unit is caused to ring when the discerned identification data is not registered in the secondary unit.

* * * * *